(12) United States Patent
Fink

(10) Patent No.: US 7,216,476 B2
(45) Date of Patent: May 15, 2007

(54) TWO-AXIS THRUST VECTORING NOZZLE

(75) Inventor: Lawrence E. Fink, Renton, WA (US)

(73) Assignee: The Boeing Company, Chicago, IL (US)

( * ) Notice: Subject to any disclaimer, the term of this patent is extended or adjusted under 35 U.S.C. 154(b) by 75 days.

(21) Appl. No.: 10/731,368

(22) Filed: Dec. 9, 2003

(65) Prior Publication Data
US 2005/0120702 A1 Jun. 9, 2005

(51) Int. Cl.
*F02K 9/84* (2006.01)

(52) U.S. Cl. .................... 60/232; 239/265.35

(58) Field of Classification Search ............ 60/232; 239/265.35, 265.43, 165.19, 265.33, 265.19
See application file for complete search history.

(56) References Cited

U.S. PATENT DOCUMENTS

| | | | |
|---|---|---|---|
| 2,850,977 A | | 9/1958 | Pollak |
| 3,073,630 A | | 1/1963 | Kuhn |
| 3,090,198 A | * | 5/1963 | Zeisloft ............. 239/265.35 |
| 3,140,584 A | * | 7/1964 | Ritchey et al. ........... 60/232 |
| 3,200,587 A | | 8/1965 | Tolson |
| 3,230,708 A | * | 1/1966 | Huang et al. ............ 60/232 |
| 3,266,244 A | * | 8/1966 | Schulze et al. ........... 60/232 |
| 3,270,505 A | * | 9/1966 | Crabill et al. ............ 60/232 |
| 3,392,918 A | * | 7/1968 | Goldberg ................ 60/232 |
| 3,945,573 A | | 3/1976 | Burgess et al. |
| 4,044,971 A | * | 8/1977 | Pharris ................. 244/7 R |
| 4,350,297 A | * | 9/1982 | Martin .............. 239/265.35 |
| 4,892,253 A | | 1/1990 | Speicher et al. |
| 5,505,408 A | | 4/1996 | Speicher et al. |
| 5,630,564 A | | 5/1997 | Speicher et al. |
| 5,662,290 A | | 9/1997 | Voigt |
| 5,887,821 A | | 3/1999 | Voigt et al. |
| 6,315,239 B1 | | 11/2001 | Voigt |

OTHER PUBLICATIONS

Article: Integrated Aerofin/Thrust Vector Control for Tactical Missiles, by Steve R. Wassom and Lawrence E. Faupell, Journal of Propulsion, vol. 7, No. 3, May-Jun. 1991, pp. 374-381.

* cited by examiner

*Primary Examiner*—Ted Kim
(74) *Attorney, Agent, or Firm*—Harness, Dickey & Pierce, P.L.C.

(57) ABSTRACT

A nozzle for a jet engine generally includes a nozzle rim and a bendable duct for communicating an exhaust flow generated by the engine to the nozzle rim. A gimbal joint pivotably couples the nozzle rim to supporting structure. The gimbal joint allows the nozzle rim to be pivoted about a first axis and a second axis, thereby allowing changes to the vector at which the exhaust flow is discharged from the nozzle rim.

26 Claims, 4 Drawing Sheets

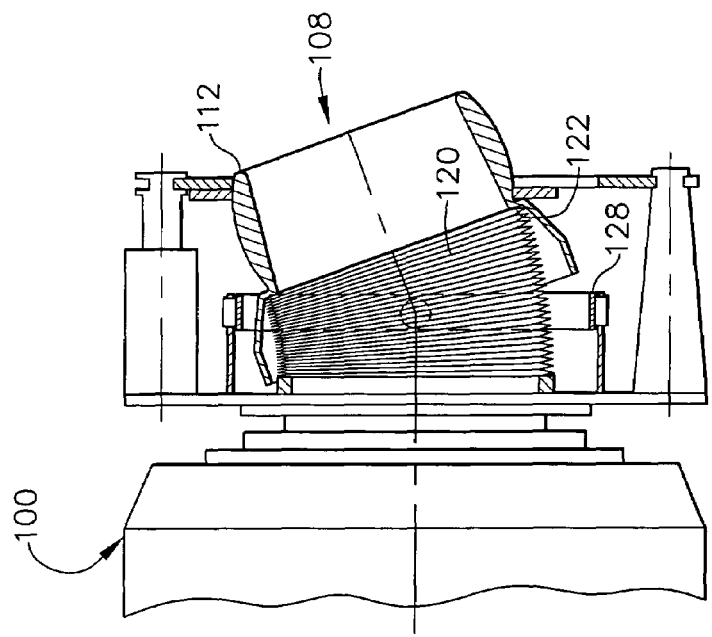
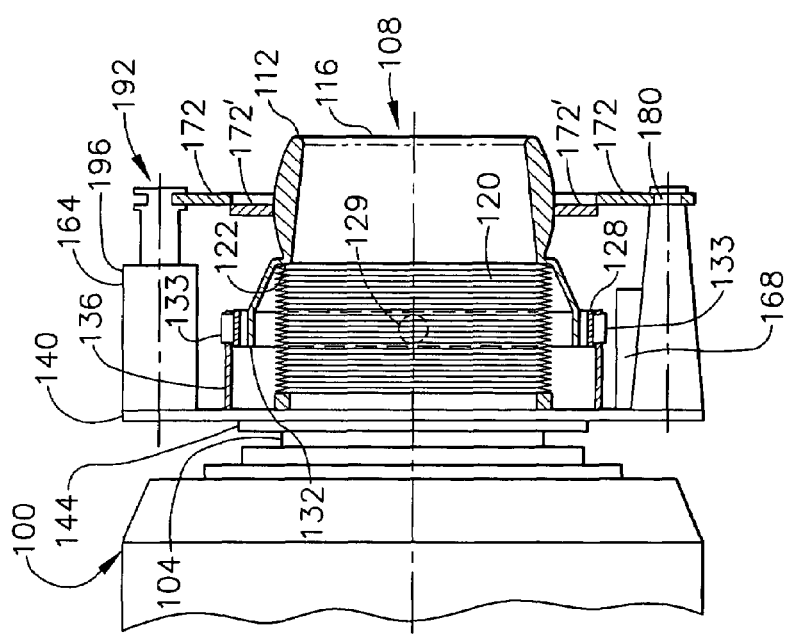

TWO-AXIS THRUST VECTORING NOZZLE

FIELD

The present invention relates generally to thrust vectoring nozzles, and more particularly to a thrust vectoring nozzle including a two-axis gimbal joint and bendable duct.

BACKGROUND

Tactical missiles may include engines with steerable or movably adjustable nozzles. Moving the nozzle changes the vector of the thrust generated by the engine. This thrust vector control (TVC) improves the maneuverability and control of the missile or other aircraft on which the nozzle is used.

SUMMARY

In one of various embodiments, a jet engine generally includes a nozzle rim and a bendable duct for communicating an exhaust flow generated by the engine to the nozzle rim. A gimbal joint pivotably couples the nozzle rim to supporting structure. The gimbal joint allows the nozzle rim to be pivoted about a first axis and a second axis, thereby allowing changes to the vector at which the exhaust flow is discharged from the nozzle rim.

In another embodiment, a nozzle for a jet engine generally includes a nozzle rim and a bendable duct for communicating an exhaust flow generated by the engine to the nozzle rim. At least one gimbal ring is pivotably coupled to supporting structure and to the nozzle rim. The gimbal ring allows the nozzle rim to be pivoted about a first axis and a second axis, thereby allowing changes to the vector at which the exhaust flow is discharged from the nozzle rim.

In another implementation, a method of operating a jet engine generally includes using the jet engine to generate an exhaust flow; communicating the exhaust flow through a bendable duct to a nozzle rim pivotably coupled to supporting structure with a two-axis gimbal joint; discharging the exhaust flow from the nozzle rim; and controllably pivoting the nozzle rim to change a vector at which the exhaust flow is discharged from the nozzle rim.

In another implementation, a method of providing a jet engine with a thrust vectoring nozzle generally includes pivotably coupling a nozzle rim to supporting structure with a two-axis gimbal joint; and coupling a bendable duct to the nozzle rim and the jet engine for communicating an exhaust flow generated by the engine to the nozzle rim.

The features, functions, and advantages can be achieved independently in various embodiments of the present disclosure or may be combined in yet other embodiments.

BRIEF DESCRIPTION OF THE DRAWINGS

The present invention will become more fully understood from the detailed description and the accompanying drawings, wherein:

FIG. 1A is a cross-sectional view of a two-axis thrust vectoring nozzle according to one embodiment of the invention;

FIG. 1B is a cross-sectional view of the two-axis thrust vectoring nozzle shown in FIG. 1A after the nozzle has been pivoted or vectored upwards;

DETAILED DESCRIPTION OF VARIOUS EMBODIMENTS

Figure 2:
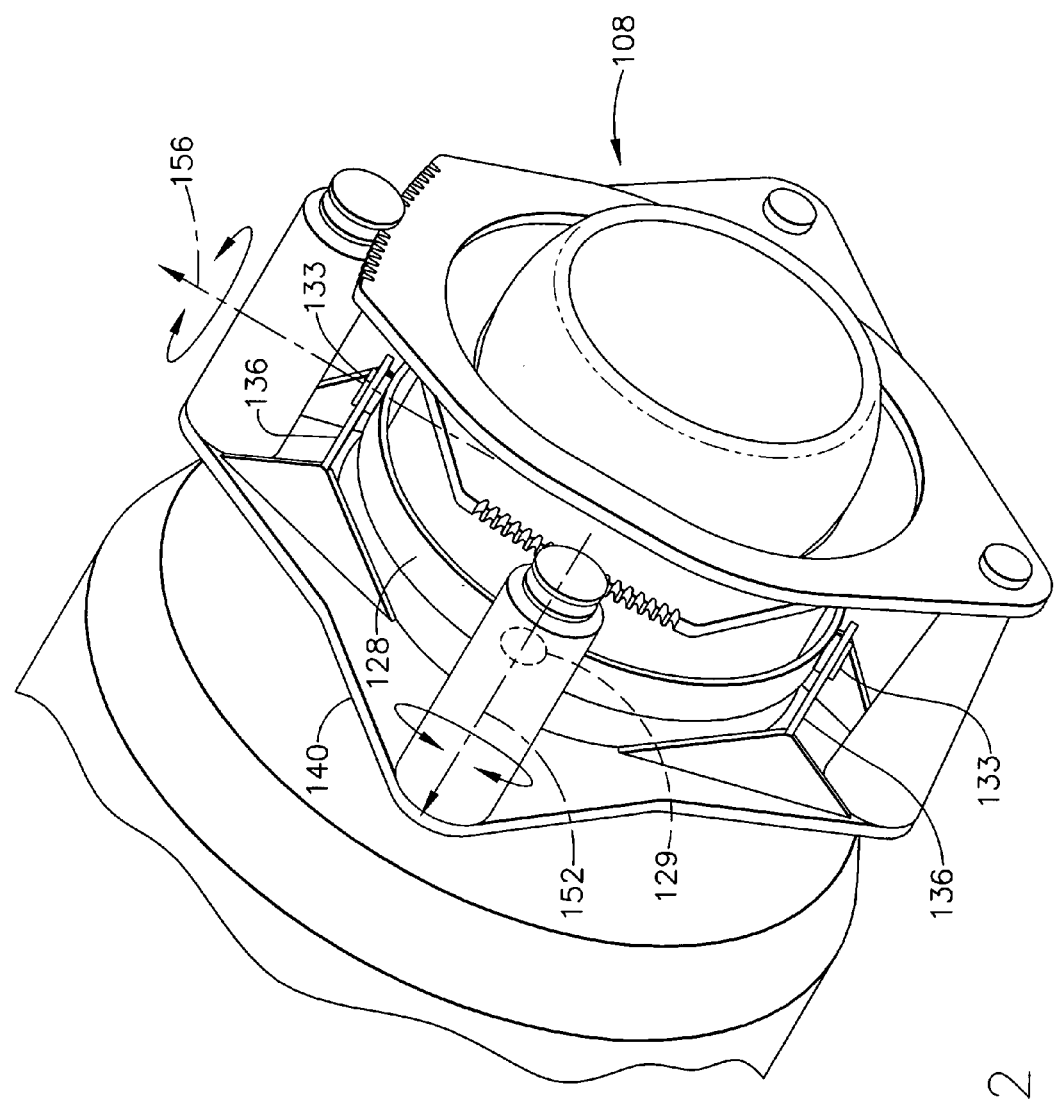
FIG. 2 is a perspective view of the nozzle shown in FIG. 1A.

The following description of the various embodiments is merely exemplary in nature and is in no way intended to limit the present disclosure, its application, or uses.

An exemplary jet engine embodying several aspects of the invention is illustrated in FIGS. 1A and 1B and is indicated generally by reference character 100. As shown, the engine 100 includes a tailpipe 104 and a thrust vectoring nozzle 108 in communication with the tailpipe 104.

In the illustrated embodiment, the nozzle 108 includes a nozzle rim 112 which defines an outlet 116. The nozzle 108 also includes a bendable duct 120 in communication with the tailpipe 104 and the nozzle rim 112. During operation, the engine 100 generates an exhaust flow which is delivered through the tailpipe 104 to the bendable duct 120. The bendable duct 120 delivers the exhaust flow to the nozzle rim 112. Thrust is then generated as the exhaust flow is discharged through the outlet 116 defined by the nozzle rim 112, which can be controllably pivoted to change the vector of the thrust.

Figure 3:
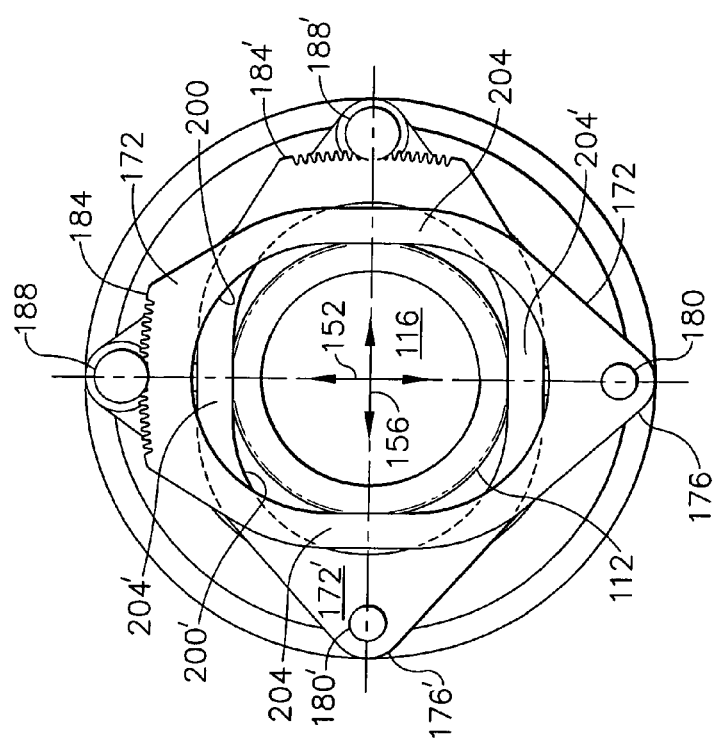
FIG. 3 is a front elevation view of the nozzle shown in FIG. 1A.

In FIG. 3, the outlet 116 defined by the nozzle rim 112 includes a generally circular cross-sectional shape. Alternatively, other cross-sectional shapes are possible for the outlet 116 depending at least in part on the particular application in which the thrust vectoring nozzle will be used.

The nozzle rim 112 is pivotably supported by a gimbal joint. The gimbal joint allow the nozzle rim 112 to be pivoted about two axes 152 and 156, which are preferably perpendicular to one another. Pivoting the nozzle rim 112 about either or both axes 152 and 156 changes the vector at which the exhaust flow is discharged from the nozzle rim 112.

With further reference to FIG. 1A, the gimbal joint includes a gimbal ring 128 pivotably coupled at points 133 to a support 136. The support 136 is attached to a structural member 140, which, in turn, is attached to a flange 144. This mounting configuration accommodates transfer of loads to the flange 144 from the gimbal ring 128 (and the nozzle rim 112 supported by the gimbal ring 128). Accordingly, thrust forces generated by exhaust flow through the outlet 116 can be transferred from the nozzle rim 112 to the flange 144 via the gimbal ring 128, support 136, and structural member 140.

In FIGS. 1 through 3, at least a portion 132 of the nozzle rim 112 is pivotably coupled to the gimbal ring 128 at points 129. This allows the nozzle rim 112 to be pivoted relative to the gimbal ring 128 about the axis 152.

Figure 4:
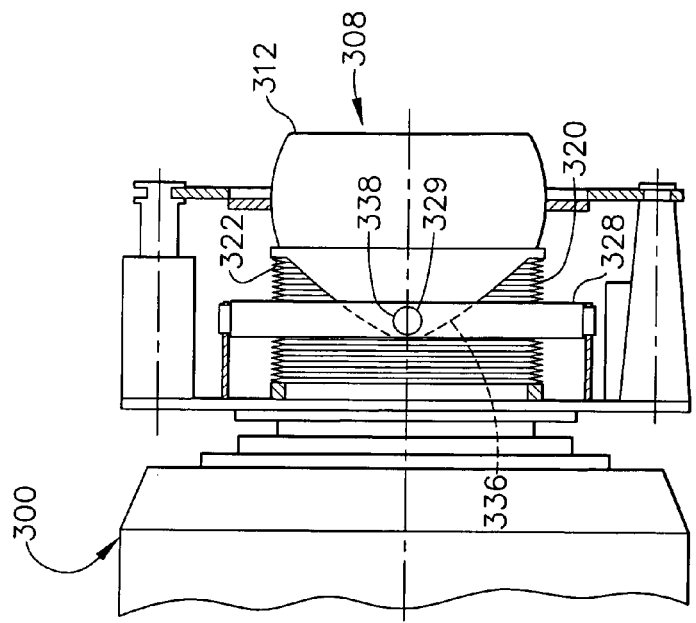
FIG. 4 is a side elevation view of a two-axis thrust vectoring nozzle according to another embodiment of the invention.
Figure 5:
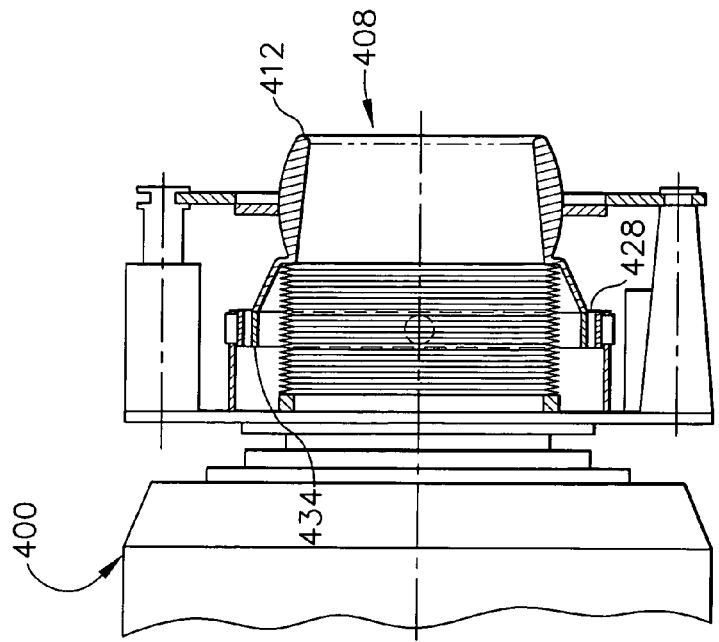
FIG. 5 is a perspective view of the nozzle rim shown in FIG. 4.
Figure 6:
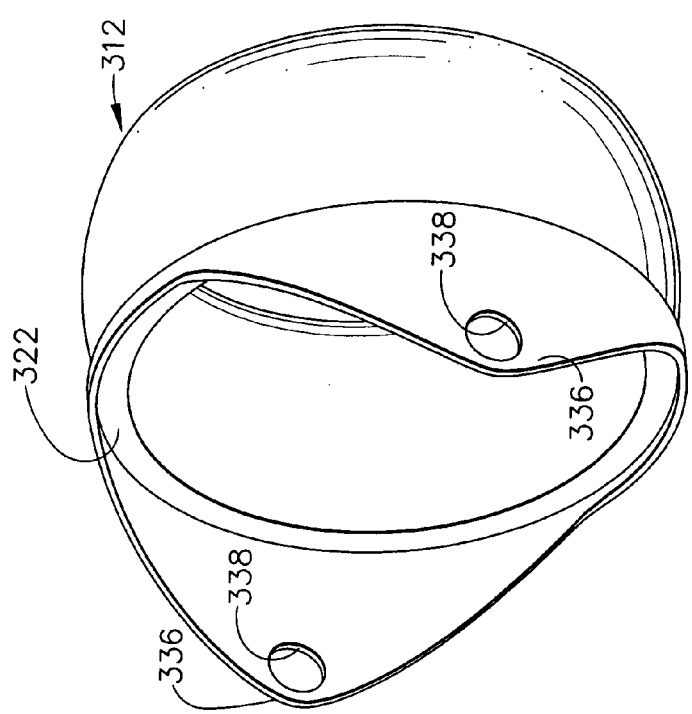
FIG. 6 is a cross-sectional view of a two-axis thrust vectoring nozzle according to another embodiment of the invention.

Alternatively, other suitable systems and methods can be employed to pivotably couple a nozzle rim to a gimbal ring. For example, FIGS. 4 and 5 illustrate an embodiment in which flanges 336 defined by a nozzle rim 312 are pivotably coupled to a gimbal ring 328. In other embodiments, one or more separate components can be used to pivotably couple a nozzle rim to a gimbal ring. For example, FIG. 6 illustrates an embodiment in which an inner gimbal ring 434 is used to pivotably couple a nozzle rim 412 to an outer gimbal ring 428.

Referring back to FIG. 1A, the bendable duct 120 is received within the nozzle rim 112 such that an end of the duct 120 is seated within an internal seat or shoulder 122 defined within the nozzle rim 112. In one embodiment, the end of the duct 120 is welded to the internal shoulder 122 the nozzle rim 112, although other suitable fastening methods can also be employed.

The bendable duct 120 can be formed from a wide range of materials, including nickel alloys, copper, aluminum, flexible ceramics, rubber, plastic, etc. Preferably, the duct is formed from one or more materials that are sufficiently flexible to allow the duct to accept a degree of strain repeatedly without significant loss of strength due to bending and fatigue from repeated bending. The duct material should be strong enough to contain the gas pressure without incurring significant deformation.

The particular material(s) used for the duct will depend in large part on the specific operating temperatures and pressures of the exhaust gases that will be flowing through the duct. For example, the relatively high temperatures associated with rocket exhaust gases would require a duct formed of a material capable of retaining its strength at such high temperatures.

By way of example only, an embodiment includes the bendable duct 120 being formed of a generally flexible nickel alloy. Nickel alloy materials have good strength properties at typical gas turbine exhaust temperatures, such as about 1800 degrees Fahrenheit. In other applications in which the exhaust gases are at relatively low temperatures, embodiments can include ducts formed of copper and/or aluminum. Yet other embodiments can include ducts formed of rubber or plastic materials which are suitable for applications in which the exhaust gases are at low pressures and at low temperatures (e.g., at room temperature of about 70° F. (21° C.)).

To increase flexibility and/or to reduce the amount of strain imparted to the duct for a given amount of bending, the bendable duct 120, or at least a portion thereof, can be convoluted. When used in conjunction with the nozzle rim 112, the bendable duct or bellows 120 enables the nozzle 108 to have a wide range of motion with a relatively low torque requirement.

In those embodiments in which the duct is convoluted, a liner can be positioned within the duct so as to define a generally smooth inner surface along the length of the substantially entirety of the duct, or at least a portion of the duct length. Accordingly, exhaust flow contacts the smooth liner surface instead of the convoluted duct surface. This, in turn, will eliminate, or at least reduce, the potential adverse influences and effects that the convoluted surface might otherwise have on the exhaust flow, such as increased friction, increased acoustic noise, and/or introduction of pressure loss due to flow separation at the convolutes.

The liner is preferably flexible but does not need to be particularly strong in those applications in which the convoluted duct provides the necessary strength. To increase the liner's flexibility, the lining can be formed from a plurality of segmented petals sized to be slidably movable within the convoluted duct as the duct is bent or flexed. For example, each liner segment can be sized to about one-fourth (¼) or less of the circumference of the duct.

FIGS. 1 through 3 also illustrate an exemplary actuation system which can be used to controllably pivot the nozzle 108. As shown, the actuation system includes a pair of nozzle actuators 164 (only one of which is visible in FIG. 1A). Both actuators 164 are responsive to a controller 168. The actuators 164 are preferably oriented generally orthogonally relative to each other to allow pivoting of the nozzle rim 112 about either or both the first and/or second axes 152 and 156.

Each of the two actuators 164 is operatively engaged with and drives a corresponding yoke plate. As shown in FIG. 3, a first actuator yoke plate 172 enables pivoting of the nozzle rim 112 about the first axis 152. A second actuator yoke plate 172' enables pivoting of the nozzle rim 112 about the second axis 156.

Each yoke plate 172, 172' has an end 176, 176' pivotably coupled to supporting structure of the engine 100 or mobile platform, for example, by an anchor or pivot pin 180, 180'. The opposite end 184, 184' of each yoke plate 176, 176' defines gear teeth engaged with a corresponding actuator gear 188, 188'.

Each actuator gear 188, 188' is coupled to a corresponding gearbox 192 (FIG. 1A) (the gearbox coupled to actuator gear 188' is hidden from view). Each actuator gearbox 192 is coupled to a motor contained within a housing 196, which, in turn, is coupled to supporting structure of the engine 100 or mobile platform.

Each yoke plate 172, 172' has an elongated central opening or slot 200, 200' defined by a pair of arms 204, 204' extend about the nozzle rim 112. The arms 204, 204' include bearing surfaces for transmitting lateral forces to the nozzle rim 112 while permitting sliding contact with the nozzle rim 112.

FIGS. 4 and 5 illustrate an alternative embodiment of an engine 300 including a thrust vectoring nozzle 308. As shown, the nozzle 308 includes a nozzle rim 312 having an end portion which defines a pair of opposed curved flanges or wings 336. The flanges 336 extend generally rearwardly from the nozzle rim 312.

Each flange 336 defines at least one opening 338. As shown in FIG. 4, the openings 338 are used to pivotably couple the nozzle rim 312 to the gimbal ring 328 at points 329. This allows the nozzle rim 312 to be pivoted relative to the gimbal ring 328. The gimbal ring 328, in turn, is pivotably coupled to supporting structure which allows the outer gimbal ring 328 to be pivoted relative to the supporting structure.

The flexible duct or bellows 320 is positioned such that its end is seated within an internal seat or shoulder 322 defined within the nozzle rim 312. In a preferred embodiment, the end of the duct 320 is welded to the internal shoulder 322 within the nozzle rim 312, although other suitable fastening methods can also be employed.

The flanges 336 are preferably integrally formed with the nozzle rim 312 as a single component, as shown in FIG. 5. By way of example, the nozzle rim 312 and flanges 336 can be monolithically formed in a casting process in which the nozzle rim 312 and flanges 336 are cast as a single component, although other suitable manufacturing processes can also be employed. Alternatively, the flanges can be defined by one or more separate components which are engaged (e.g., bonded, welded, etc.) to the nozzle rim.

FIG. 6 illustrates an alternative embodiment of an engine 400 including a thrust vectoring nozzle 408. As shown, the nozzle 408 includes a nozzle rim 412 attached (e.g., welded, bonded, etc.) to an inner gimbal ring 434. In other embodiments, however, the inner gimbal ring 434 can be integrally formed with the nozzle rim 412 as a single component, such as by casting or other suitable manufacturing process.

The inner gimbal ring 434 is pivotably coupled to an outer gimbal ring 428. This allows the inner gimbal ring 434 and nozzle rim 412 supported thereby to be pivoted relative to the outer gimbal ring 428. The outer gimbal ring 428 is pivotably coupled to supporting structure which allows the outer gimbal ring 428 to be pivoted relative to the supporting structure.

In various embodiments, the nozzle rim and flexible duct/bellows can have a monolithic construction and be integrally formed as a single component. In which case, the monolithic nozzle rim and bellows preferably define generally smooth interior sidewalls (i.e., not convoluted) at the exhaust exit or outlet so as to facilitate flow uniformity and provide good nozzle thrust efficiency. By way of example, the exit area (i.e., flow area at the rim) is preferably slightly less than the duct area to avoid pressure loss that can occur with high-speed flow in ducts. For example, the exit area can be sized so that it is no greater than about two-thirds (⅔) the duct area.

FIGS. 1 through 6 illustrate various embodiments which include convergent nozzle rims suitable for use with relatively low nozzle pressure ratios (e.g., between about two to threes time atmospheric pressure), which are, for example, typically encountered with cruise missile engines. Alternatively, however, other embodiments include convergent-divergent nozzle rims that are suitable for use with higher nozzle pressure ratios. In which case, the divergent portion causes supersonic flow acceleration and improves nozzle efficiency at the higher nozzle pressure ratios.

In another implementation, a method of operating a jet engine, generally includes using the jet engine to generate an exhaust flow; communicating the exhaust flow through a bendable duct to a nozzle rim pivotably coupled to supporting structure with a two-axis gimbal joint; discharging the exhaust flow from the nozzle rim; and controllably pivoting the nozzle rim to change a vector at which the exhaust flow is discharged from the nozzle rim.

In another implementation, a method of providing a jet engine with a thrust vectoring nozzle generally includes pivotably coupling a nozzle rim to supporting structure with a two-axis gimbal joint; and coupling a bendable duct to the nozzle rim and the jet engine for communicating an exhaust flow generated by the engine to the nozzle rim.

Accordingly, various embodiments of the invention provide the benefits of relatively high thrust and nozzle efficiencies over a wide range of vector angles and nozzle pressure ratios. Further, various embodiments are relatively compact and can be implemented to provide more effective weapon systems through increased range and maneuverability, for example, in size-limited missile applications.

The invention is applicable to a wide range of jet engines (e.g., but not limited to gas turbine engines, turbofan engines, turbojet engines, rocket engines, etc.) Accordingly, the specific references to jet engine herein should not be construed as limiting the scope of the present invention to only one specific form/type of engine.

The invention is also applicable to a wide range of mobile platforms (e.g., but not limited to, missiles, aircraft, rockets, reusable launch vehicles, among other vehicles or mobile platforms having a thrust generator where thrust vectoring is desired). Accordingly, the scope of the present invention should not be limited to any particular form/type of mobile platform.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A jet engine for a mobile platform, the engine comprising:
   a gimbal ring configured to pivot relative to the jet engine about a first axis;
   a nozzle rim having a flange portion pivotally coupled to the gimbal ring, the nozzle rim being configured to pivot relative to the gimbal ring about a second axis;
   a first actuator yoke plate that operatively engages the nozzle rim to cause the gimbal ring and nozzle rim to pivot relative to the jet engine about the first axis;
   a second actuator yoke plate that operatively engages the nozzle rim to cause the nozzle rim to pivot relative to the gimbal ring about the second axis;
   a bendable duct having an outlet end that is received in an internal shoulder within the nozzle rim, the bendable duct defining a conduit in which exhaust flow generated by the jet engine is received and delivered directly to the nozzle rim; and
   first and second drive actuators for controlling the movement of the first and second actuator yoke plates to allow pivoting of the nozzle rim about the first axis and the second axis for changing a vector at which the exhaust flow is discharged from the nozzle rim.

2. The engine of claim 1, wherein the gimbal joint is coupled to supporting structure to allow pivoting of the gimbal ring relative to the supporting structure and the jet engine.

3. The engine of claim 1, wherein the first axis is generally perpendicular to the second axis.

4. The engine of claim 1, wherein the first actuator yoke plate is rotated by the first drive actuator for pivoting the nozzle about the first axis; and the second actuator yoke plate is rotated by the first drive actuator for pivoting the nozzle about the second axis.

5. The engine of claim 4, wherein each said yoke plate includes:
   a first end pivotably coupled to supporting structure;
   a second end defining gear teeth engaged with a corresponding actuator gear; and
   a pair of arms defining an opening and extending about the nozzle rim, the arms including bearing surfaces for transmitting lateral forces to the nozzle rim while permitting sliding contact with the nozzle rim.

6. The engine of claim 1, wherein the bendable duct is convoluted.

7. A mobile platform comprising the engine of claim 1.

8. The engine of claim 1, wherein the bendable duct is made of a material having good strength properties at a temperature of about 1800 degrees Fahrenheit. duct material is sufficiently flexible to allow the duct to accept a degree of strain repeatedly without significant loss of strength due to fatigue from repeated bending.

9. The engine of claim 8, wherein the bendable duct material is sufficiently flexible to allow the duct to accept a degree of strain repeatedly without significant loss of strength due to fatigue from repeated bending.

10. The engine of claim 1, further comprising:
   a first ring support fixed to supporting structure;
   a second ring support fixed to supporting structure opposite the first ring support;
   wherein a first side of the gimbal ring is pivotally coupled to the first ring support, and a second side of the gimbal ring is pivotally coupled to the second ring support such that the gimbal ring is pivotally coupled on opposite sides to support structure.

11. The engine of claim 10, wherein the first and second ring supports each comprise an elongated member projecting axially from supporting structure.

12. A nozzle for a jet engine, the nozzle comprising:
a nozzle rim having a flange portion and an interior shoulder within the nozzle rim;
a bendable duct having an outlet end received within the nozzle rim adjacent the inlet shoulder, the bendable duct defining a conduit in which exhaust flow generated by the jet engine is received and delivered directly to the interior of the nozzle rim; and
at least one gimbal ring pivotably coupled to supporting structure and to the flange portion of the nozzle rim to allow pivoting of the nozzle rim relative to the gimbal ring about a first axis and pivoting of the nozzle rim relative to the supporting structure about a second axis for changing a vector at which the exhaust flow is discharged from the nozzle rim.

13. The nozzle of claim 12, wherein the first axis is generally perpendicular to the second axis.

14. The nozzle of claim 12, further comprising an actuation system for controllably pivoting the nozzle rim.

15. The nozzle of claim 14, wherein the actuator system includes:
a first actuator yoke plate for pivoting the nozzle about the first axis; and
a second actuator yoke plate for pivoting the nozzle about the second axis.

16. The nozzle of claim 15, wherein each said yoke plate includes:
a first end pivotably coupled to supporting structure;
a second end defining gear teeth engaged with a corresponding actuator gear; and
a pair of arms defining an opening and extending about the nozzle rim, the arms including bearing surfaces for transmitting lateral forces to the nozzle rim while permitting sliding contact with the nozzle rim.

17. The nozzle of claim 12, wherein the bendable duct is convoluted.

18. A mobile platform comprising the nozzle of claim 12.

19. The nozzle of claim 12, further comprising:
a first ring support fixed to supporting structure;
a second ring support fixed to supporting structure opposite the first ring support;
wherein a first side of the gimbal ring is pivotally coupled to the first ring support, and a second side of the gimbal ring is pivotally coupled to the second ring support such that the gimbal ring is pivotally coupled on opposite sides to support structure.

20. The engine of claim 19, wherein the first and second ring supports each comprise an elongated member projecting axially from supporting structure.

21. A method of operating a jet engine, the method comprising:
using the jet engine to generate an exhaust flow;
receiving the exhaust flow in a bendable duct that is received within a nozzle rim for delivery of exhaust to a nozzle rim having a flange portion pivotably coupled to supporting structure with a two-axis gimbal joint;
discharging the exhaust flow from the nozzle rim; and
controllably pivoting the nozzle rim to change a vector at which the exhaust flow is discharged from the nozzle rim.

22. The method of claim 21, wherein the controllably pivoting comprises one or more of:
pivoting the nozzle rim about a first axis; and
pivoting the nozzle rim about a second axis generally perpendicular to the first axis.

23. The method of claim 22, wherein:
pivoting the nozzel rim about a first axis includes pivoting a gimbal ring pivotably coupled to the supporting structure and the nozzle rim relative to the supporting structure; and
pivoting the nozzle rim about a second axis includes pivoting the nozzle rim relative to the gimbal ring.

24. The method of claim 22, wherein the controllably pivoting comprises:
actuating a first actuator yoke plate to pivot the nozzle about the first axis; and
actuating a second actuator yoke plate to pivot the nozzle about the second axis.

25. A method of providing a jet engine with a thrust vectoring nozzle, the method comprising:
pivotably coupling a flange portion of a nozzle rim to supporting structure adjacent said jet engine, with a two-axis gimbal joint; and
coupling a bendable duct to an inlet shoulder within the interior of the nozzle rim and the engine for receiving and delivering an exhaust flow generated by the engine to the interior of the nozzle rim.

26. The method of claim 25, wherein the pivotably coupling comprises:
pivotably coupling at least one gimbal ring to supporting structure; and
pivotably coupling the nozzle rim into the gimbal ring.

* * * * *